(12) United States Patent
Hunnekuhl et al.

(10) Patent No.: US 10,035,194 B2
(45) Date of Patent: Jul. 31, 2018

(54) PARING AND CUTTING TOOL

(71) Applicant: Georg Fischer Rohrleitungssysteme AG, Schaffhausen (CH)

(72) Inventors: Joerg Hunnekuhl, Jestetten (DE); Juergen Roesch, Lenzkirch (DE); Markus Breyer, Radolfzell (DE)

(73) Assignee: Georg Fischer Rohrleitungssysteme AG (CH)

( * ) Notice: Subject to any disclaimer, the term of this patent is extended or adjusted under 35 U.S.C. 154(b) by 0 days.

(21) Appl. No.: 15/441,824

(22) Filed: Feb. 24, 2017

(65) Prior Publication Data

US 2017/0252831 A1 Sep. 7, 2017

(30) Foreign Application Priority Data

Mar. 1, 2016 (EP) .................................... 16158067

(51) Int. Cl.
| | | |
|---|---|---|
| *B23B 5/00* | (2006.01) | |
| *B23B 5/16* | (2006.01) | |
| *B23B 5/14* | (2006.01) | |

(52) U.S. Cl.
CPC ............... *B23B 5/162* (2013.01); *B23B 5/14* (2013.01); *B23B 2215/72* (2013.01); *B23B 2226/61* (2013.01); *B23B 2228/36* (2013.01)

(58) Field of Classification Search
CPC .. B23B 5/16; B23B 5/12; B23B 5/162; B23B 5/163; B23B 2215/72; B23B 2240/36; B23C 3/122; B23C 3/124; B23C 1/20
See application file for complete search history.

(56) References Cited

U.S. PATENT DOCUMENTS

| | | | |
|---|---|---|---|
| 1,756,171 A | 4/1930 | Bommer | |
| 3,051,059 A * | 8/1962 | Davey | B23B 5/162 |
| | | | 408/82 |

(Continued)

FOREIGN PATENT DOCUMENTS

| | | |
|---|---|---|
| DE | 29516513 U1 | 1/1997 |
| GB | 783705 A | 9/1957 |
| GB | 1520687 A | 8/1978 |

OTHER PUBLICATIONS

European Search Report (in German) dated Sep. 5, 2016 regarding EP Application No. 16158067.5 (7 pages).

(Continued)

*Primary Examiner* — Will Fridie, Jr.
(74) *Attorney, Agent, or Firm* — Harness, Dickey & Pierce, P.L.C.

(57) ABSTRACT

A paring and cutting tool, and a therewith associated method, for the stripping and paring of pre-insulated pipe ends, in particular of the outside diameter of the medium-conveying pipe comprising a clamping unit for the reception of the pipe end, a guide unit for the feed movement of the stripping and paring unit, wherein the guide unit extends through the clamping unit, a cutting unit for separating the outer pipe and the insulating layer, a carrier and a stripping and paring unit, wherein the stripping and paring unit has a paring element, preferably a paring blade, and a stripping element, preferably a stripping contour, for the simultaneous stripping and paring of the pipe end, in particular of the medium-conveying pipe end.

13 Claims, 4 Drawing Sheets

(56) References Cited

U.S. PATENT DOCUMENTS

| | | | | |
|---|---|---|---|---|
| 3,540,329 | A * | 11/1970 | Gill | B23B 5/162 |
| | | | | 144/205 |
| 4,364,290 | A * | 12/1982 | Astle | B23B 5/162 |
| | | | | 407/106 |
| 4,744,123 | A * | 5/1988 | Le Testu | B23B 5/162 |
| | | | | 15/104.04 |
| 6,176,163 | B1 * | 1/2001 | Kramer | B23B 5/162 |
| | | | | 82/113 |
| 9,255,641 | B2 | 2/2016 | Raible et al. | |
| 2011/0041343 | A1 * | 2/2011 | Benson | B23B 3/26 |
| | | | | 30/97 |
| 2011/0041658 | A1 * | 2/2011 | Weinberg | B23B 5/162 |
| | | | | 82/113 |

OTHER PUBLICATIONS

U.S. Appl. No. 15/410,378, filed Jan. 19, 2017, Edin Hasific et al.

* cited by examiner

PARING AND CUTTING TOOL

CROSS-REFERENCE TO RELATED APPLICATIONS

This application claims the benefit and priority of EP 16 158 067.5, filed Mar. 1, 2016. The entire disclosure of the above application is incorporated herein by reference.

BACKGROUND OF THE INVENTION

Technical Field

The invention relates to a paring and cutting tool for the stripping and paring of pre-insulated pipe ends, in particular of the outside diameter of the medium-conveying pipe, and to the method, comprising a clamping unit for the centric reception of the pipe end, a guide unit for the feed movement of the stripping and paring unit for separating the outer pipe and the insulating layer, wherein the guide unit extends through the clamping unit, a cutting unit, a carrier and a stripping and paring unit.

Discussion

This concerns a tool, and a therewith associated method, which is used for pre-insulated pipelines. Pre-insulated pipelines of this kind are used where a good insulation of the medium from the environmental conditions is required, for instance for the transport of coolants in cooling systems. Around the inner pipe which transports a medium, or the medium-conveying pipe, preferably of plastic, is arranged an insulating layer, preferably of foamed plastic, wherein the insulating layer is surrounded by an outer skin or an outer pipe, which are preferably formed of plastic, but also of a metal, and serve to protect the insulating layer. Such pipelines must be stripped of insulation at their ends and the medium-conveying pipe must be pared on the outer casing surface so as to be able to be connected to fittings or further pipes, since the connection is made via the medium-conveying pipe in order to ensure leak-tightness.

From the prior art, tools of the kind which pare and cut are known only for pipes which, though they are multilayered, have no insulating layer.

DE 295 16 513 U1 discloses such a tool, wherein this is suitable only for pipes having a plurality of casing layers, but not for insulating layers.

Until now, pre-insulated pipes were generally stripped of insulation manually, without appropriate tool, which comprises all steps such as stripping and paring of the medium-conveying pipe and prepares it for connection. Thus the insertion depth was firstly gauged in order to determine how far the insulating layer and the outer pipe have to be removed. Then the outer pipe was separated, and afterwards the insulating layer. In order to ensure a good surface for the welding of the exposed medium-conveying pipe to, for instance, a fitting to be welded thereto, the outer surface of the medium-conveying pipe had also to be pared.

Besides the drawback of the large number of individual steps which have to be performed, there is also the major drawback of a high source of errors. As a result of the manual measurement of the insertion depth which has to be stripped, it is quite possible for an error to be made herein, as well as in the removal of the insulating layer, whereby the medium-conveying pipe can also be inadvertently damaged.

SUMMARY OF THE INVENTION

An aspect of the invention is to propose a paring and cutting tool, and a therewith associated method, which provides a simple and rapid stripping and paring of pre-insulated pipeline ends, and to eliminate damaging of the medium-conveying pipe and further possible error sources of the manual operation. Moreover, the tool should be adaptable to different pipe diameters.

This is preferably achieved by virtue of the fact that the stripping and paring unit has a paring element, preferably a paring blade, and a stripping element, preferably a stripping contour, for the simultaneous stripping and paring of the pipe end, in particular of the medium-conveying pipe end, wherein the stripping and paring takes place during the same feed movement of the stripping and paring unit.

The paring and cutting tool for the stripping and paring of pre-insulated pipe ends, in particular of the outside diameter or the outer casing surface of the medium-conveying pipe, comprises a clamping unit for the centric reception of the pipe end. The clamping unit is introduced into the medium-conveying pipe, whereby the paring and cutting tool is received concentrically to the medium-conveying pipe in order also to be able to perform the stripping, paring and cutting operation concentrically to the medium-conveying pipe. The reception or clamping via the medium-conveying pipe is important, since neither the insulating layer nor the outer pipe have to be arranged concentrically to the medium-conveying pipe. Due to the manufacture, an axially offset arrangement of the medium-conveying pipe relative to the insulating layer and to the outer pipe can here ensue, whereby a fastening of the tool to the outer periphery of the pre-insulated pipe could lead to damage to the medium-conveying pipe.

Furthermore, the paring and cutting tool has a guide unit, which serves, inter alia, for the feed movement of the stripping and paring unit. Moreover, the guide unit extends through the clamping unit.

The guide unit has a feed region, which serves for the stripping and paring of the pipe end. Preferably, the feed region of the guide unit is configured as a spindle or spindle sleeve. By the rotation of the carrier, in which a spindle nut is disposed, the feed movement along the feed region is obtained and the stripping and paring unit is advanced accordingly. Moreover, the guide unit has a clamping region, which serves for the clamping of the clamping unit.

The paring and cutting tool has, moreover, a cutting unit for separating the outer pipe and the insulating layer. The carrier of the tool connects the units one to another. As the fundamental unit, the paring and cutting tool has a stripping and paring unit. The stripping and paring unit is arranged on the carrier or on the spindle nut which is disposed in the carrier and is movable on the feed region or the spindle of the guide unit. In order simultaneously to part the pre-insulated pipe end from the insulating layer and to pare the outer casing surface of the medium-conveying pipe, the stripping and paring unit has a stripping element, by means of which the insulating layer is separated from the outer casing surface of the medium-conveying pipe. In order that no separate paring pass has to take place in order to pare the outer casing surface of the medium-conveying pipe, the stripping and paring unit also has a paring element, whereby in the same operation, besides the stripping, also the paring takes place. By rotation of the carrier, with the aid of a handle, about the guide element or the feed region, due to the spindle nut disposed in the carrier and due to the spindle or spindle sleeve in the feed region of the guide unit, the carrier, with the stripping and paring unit arranged thereon or on the spindle nut, moves into the depth of the pipe to be pared. Preferably, the paring element is configured as a paring blade, and the stripping element as a stripping contour. It has proved advantageous if the paring element or paring blade and the stripping element or stripping contour are arranged on a blade, preferably on the same blade. The blade is preferably configured as an elongate plate, by means of which inroads can be made into the depth of the insulating layer. The blade is distinguished by the fact that the stripping contour is arranged on regions of the periphery of the blade and is preferably configured as a partially circumferential bevel, and the paring blade on an edge of a recess which is present in the blade. The width of the recess, and thus also the width of the paring blade, are preferably equal to or wider than the pitch of the spindle in the feed region of the guide unit.

By the generated feed movement, the blade pierces the insulating layer just above the outside diameter of the medium-conveying pipe. By means of the insulating layer, the blade is pushed onto the outer casing surface of the medium-conveying pipe. The insulating layer brings a slight contact force to bear on the blade and yet has a springy effect, whereby the blade is not pressed rigidly onto the outside diameter of the medium-conveying pipe, but rather with a pretension, thereby positively aiding the stripping and the paring.

The blade of the stripping and paring unit is fastened to a blade holder. The stripping and paring unit is dimension-dependent, that is to say that the blade holder is configured differently wide, since the stop face of the blade holder defines the possible insertion depth of the blade into the pipe to be stripped. The blade is fastened to the blade holder and projects parallel to the clamping unit up to the rotary cutter of the cutting unit, or the paring element of the blade is located directly beneath the rotary cutter of the cutting unit. It is thereby ensured that the medium-conveying pipe is stripped of insulation and pared to the point where also the insulating layer and the outer pipe are separated by the rotary cutter. In the case of larger pipe dimensions, furthermore, the blade holder has a larger diameter, since this predefines the piercing position of the blade just above the outside diameter of the medium-conveying pipe.

After the operation of parting the insulation from the outer surface of the medium-conveying pipe and the paring operation, the separation of the stripped insulation from the rest of the pipe, or its insulation and the outer pipe, takes place. This is realized by means of the cutting unit. The cutting unit is arranged on the carrier and is adjustable in height or diameter. Since, as already mentioned, the paring and cutting tool is usable for different pipe dimensions, the cutting unit is adjustable on the carrier. A preferred positional adjustment of the cutting unit is given by positioning bores in the carrier and a locking pin which positions the cutting unit at the appropriate position. In order to perform the separation of the outer pipe and the insulating layer, the cutting unit must rotate about the pipe end or the guide unit or the clamping unit. This is achieved by virtue of the fact that the carrier has a mounting, or in the carrier there is disposed a mounting, preferably ball bearings, which in turn are disposed on the spindle nut, and the carrier can hence be rotated about the spindle nut or about the guide unit once the mounting has been unlocked by the release of the unlocking unit.

Since the rotation of the carrier is undesirable during the stripping and paring operation, however, but rather a feed movement of the carrier is demanded there, this rotational movement of the carrier is suppressed by means of the unlocking unit. Preferably, the unlocking unit is configured as an inherently resilient pin, which is disposed in the mounting region of the carrier and projects through a bore into the spindle nut and thus suppresses the rotation of the carrier. If the unlocking unit is unlocked by withdrawal of the spring-loaded pin, specifically from the bore of the spindle nut, whereupon the spring-loaded pin nevertheless remains on the carrier, the carrier, and hence also the cutting unit, can be rotated about the guide unit, or the clamping unit or the pipe, and can be cut off by the knife, preferably a rotary cutter, arranged on the cutting unit, through several revolutions. The cutting depth of the rotary cutter can be adjusted via a spindle, though this adjustment is possible only up to the medium-conveying pipe so as definitely not to affect this.

In order that, during the stripping and paring operation, the rotary cutter is somewhat distanced from the outer pipe of the pipe ends and yet this distance does not have to be bridged with the spindle, the cutting unit has a type of rapid feed, with the spindle being disposed in a slide, which rapid feed, through depression of the knob, brings the slide, with spindle disposed therein and the rotary cutter arranged thereon, into the starting position for cutting.

The paring and cutting tool has a pipe-dimension-related coding system, wherein the coding system serves to avoid errors with respect to an incorrectly adjusted paring and cutting tool. By means of the coding system, it is not possible to adjust the cutting unit to a smaller dimensioned pipe, for instance 32 mm, if a stripping and paring unit for a 90 mm medium-conveying pipe is fastened to the tool. The adjustment of the cutting unit is preferredly made via the positioning bores. Through the arrangement of a dimension-limiting bracket on the cutting unit, the said bracket likewise jointly adjusts itself and thereby prevents a lower positioning of the cutting unit than is permitted by the stripping and paring unit. Moreover, the coding system also precludes the rotary cutter from affecting or harming the outer casing surface of the medium-conveying pipe.

In order to ensure an optimal clamping of the pipe ends, the pipe end, as already mentioned, is clamped via the inside diameter of the medium-conveying pipe. For this purpose, the clamping unit has clamping jaws, preferably three. Moreover, the clamping unit has clamping cones, which are arranged coaxially to one another and between which the clamping jaws are disposed. As already mentioned, the guide unit, or the clamping region of the guide unit, projects through the clamping unit. This clamping region has a thread on the clamping shaft on which the clamping cones are disposed and, as a result of the screwing together, the clamping cones move reciprocally towards one another and thereby push the intermediate clamping jaws outwards and thus clamp the pipe end from the inside. In order to accommodate the different pipe dimensions, still dimension-dependent jaws can be adapted to the clamping jaws arranged on the paring and cutting tool or on the clamping unit.

A preferred embodiment of the clamping cones lies in the fact that the shape of a clamping cone is formed of at least two cone segments. Preferably, three cone segments extend over the clamping cone, wherein their centre axes run in parallel and their centre points of the base area are arranged regularly on a notional circle. This shape of a clamping cone enables a better support for the clamping jaws. This means that each of the three clamping jaws rests on the respective cone segment via a peripheral line, and not, as with a normal cone, where the clamping jaws rest only at one point.

The method for stripping and paring a pre-insulated pipe end by means of a paring and cutting tool according to the invention is distinguished by the fact that the stripping and paring takes place simultaneously or during the same feed movement of the stripping and paring unit. Furthermore, a major advantage lies in the fact that also the separation of the outer pipe, as well as of the insulating layer, is realized with the same tool, wherein this takes place after the stripping and paring.

REFERENCE SYMBOL LIST 1 paring and cutting tool
2 clamping unit
3 guide unit
4 cutting unit
5 stripping and paring unit
6 carrier
7 paring element
8 stripping element
9 blade
10 unlocking unit
11 coding system
12 dimension-limiting bracket
13 clamping jaws
14 clamping cones
15 cone segment
16 feed region of the guide unit (spindle)
17 clamping region of the guide unit
18 mounting
19 spindle nut
20 handle
21 blade holder
22 positioning bores
23 rotary cutter
24 spindle
25 slide
26 knob
27 medium-conveying pipe
28 locking mechanism
29 diameter-specific jaws
30 clamping shaft
31 retaining element
32 blade holder stop face
33 insulating layer
34 locking pin
35 bearings
36 outer pipe

BRIEF DESCRIPTION OF THE DRAWINGS

An illustrative embodiment of the invention is described with reference to the figures, the invention not just being limited to the illustrative embodiment, wherein.

DETAILED DESCRIPTION OF THE PREFERRED EMBODIMENTS

Figure 1:
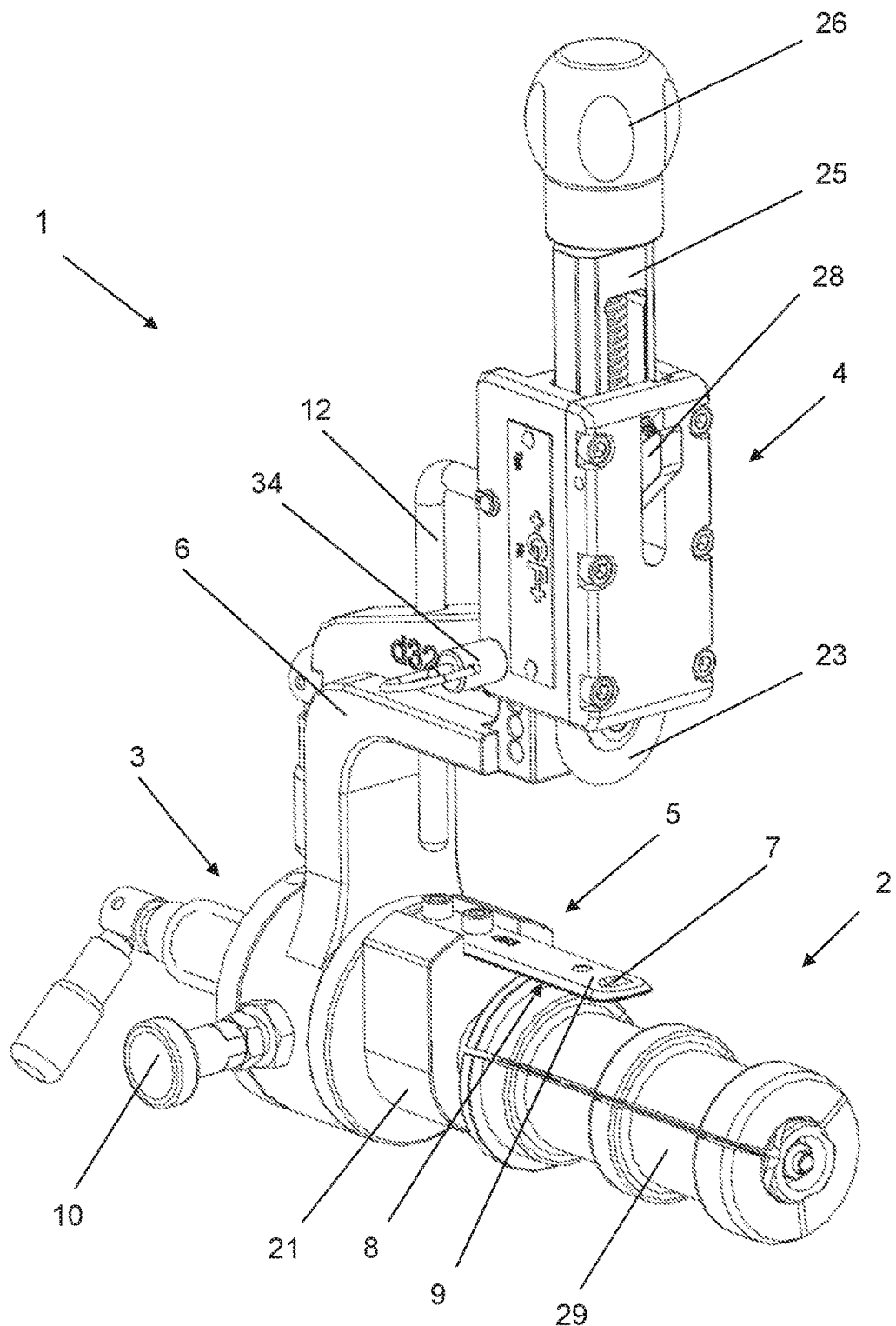
FIG. 1 shows a three-dimensional view of a tool according to the invention.

FIG. 1 shows a three-dimensional view of a paring and cutting tool 1 according to the invention. The paring and cutting tool 1 serves for the stripping and paring of pre-insulated pipe ends, in particular of the medium-conveying pipe 27. This is used to be able to connect the stripped medium-conveying pipe 27 to a further pipe or fitting in order to insert the stripped region or the bare medium-conveying pipe 27 into, for instance, a fitting, and then to sealingly connect these one to the other, for instance by welding. Preferably, this concerns plastics pipes, that is to say that both the medium-conveying pipe 27 is preferably made of plastic and also the outer pipe for protecting the insulating layer is made of plastic, wherein it has also been shown that a further advantageous embodiment of the outer pipe is made of metal. The insulating layer is preferably a foamed plastic.

Figure 2:
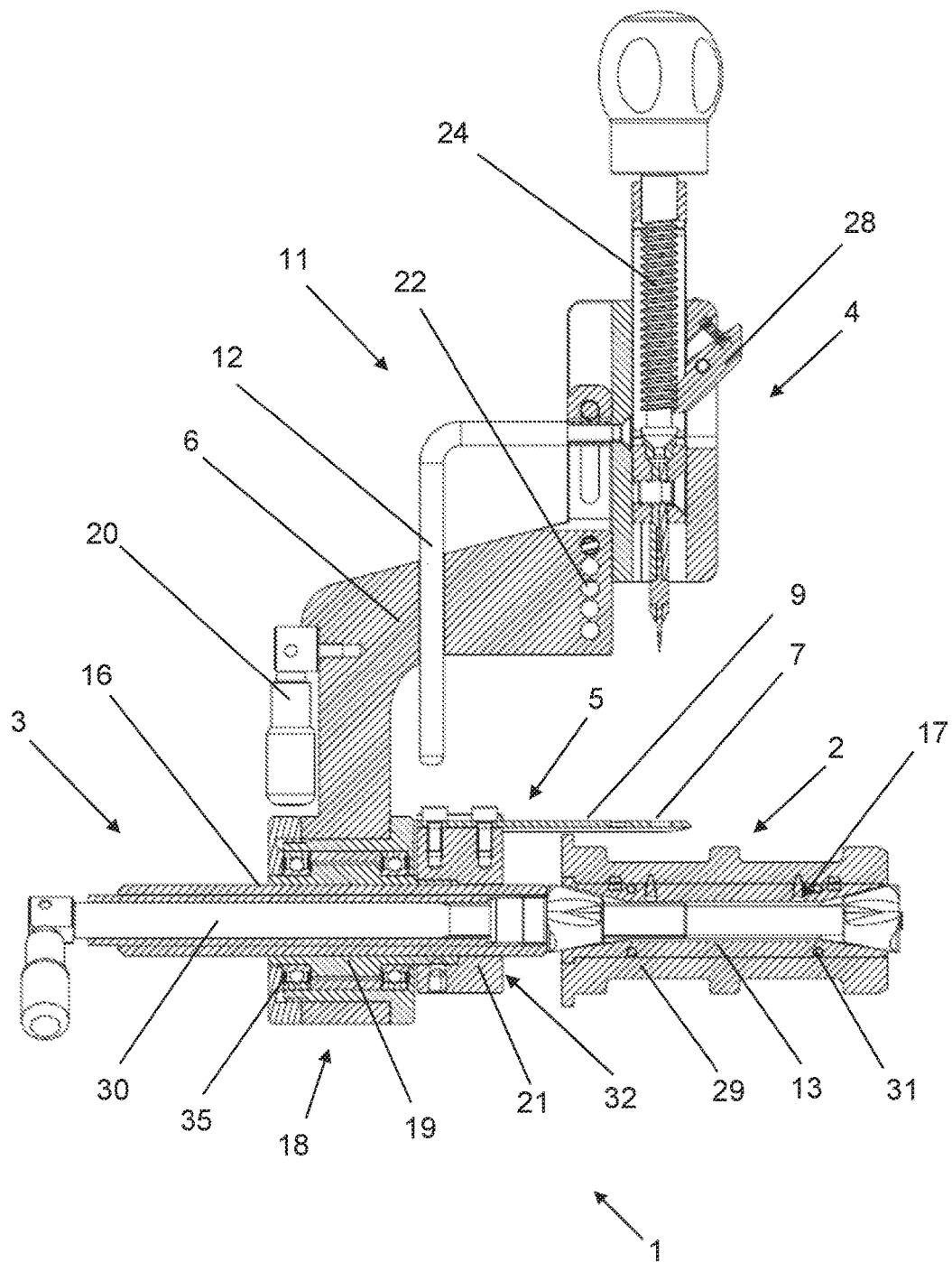
FIG. 2 shows a longitudinal section of a tool according to the invention.

The paring and cutting tool 1 comprises a clamping unit 2, which serves to receive the medium-conveying pipe 27. By a clamping of the pipe end on the medium-conveying pipe 27, it is ensured that the stripping, paring, and cutting operation takes place concentrically to the medium-conveying pipe 27, which is essential in order that the medium-conveying pipe 27 is not damaged. Similarly, the tool 1 comprises a guide unit 3, inter alia for the feed movement of the stripping and paring unit 5, wherein the feed movement is initiated by the carrier 6, by rotation of the carrier 6 about the spindle or spindle sleeve of the feed region 16 of the guide unit 3. The carrier 6 is configured as a type of arm with mounting 18, as can clearly be seen from FIG. 2. The carrier 6 has a spindle nut 19, which, by the rotation of the carrier 6, is movable on the spindle or in the feed region 16 of the guide unit 3. On the spindle nut 19 is arranged the stripping and paring unit 5, which is adaptable, and thus also easily exchangeable, as a result of merely being mounted onto the spindle nut 19. The stripping and paring unit 5 is arranged in a rotationally secure manner on the spindle nut 19. The guide unit 3 extends through the clamping unit 2, as well as through the mounting 18 or through the spindle nut 19 in the carrier 6. The guide unit 3 has a feed region 16, as already mentioned, which is preferably configured as a spindle or spindle nut. Furthermore, the guide unit 3 has a clamping region 17, which serves to clamp the pipe end in place over the inside diameter of the medium-conveying pipe 27. In FIGS. 1 and 2, diameter-specific jaws 25 are already adapted to the clamping jaws 13, wherein this adaptation can be realized by pins, as well as magnetically or in some other way.

Figure 3:
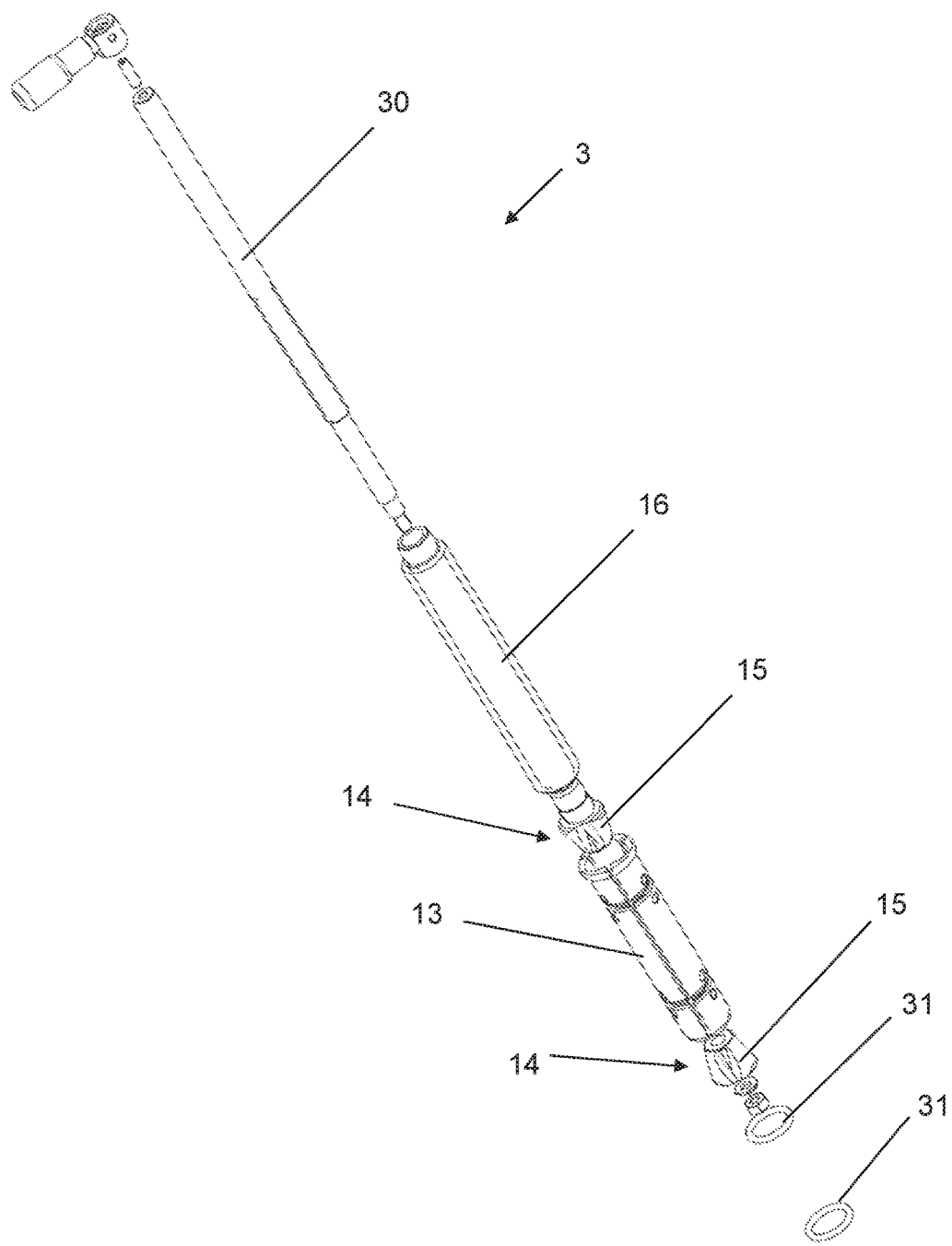
FIG. 3 shows an exploded view of the guide unit.

FIG. 3 shows the guide unit 2 in an exploded representation, in which it can clearly be seen that preferably three clamping jaws 13 are arranged in the clamping region 17 of the guide unit 3. The guide unit 3 has a clamping shaft 30, which extends through the feed region 17 or the spindle sleeve. On the clamping shaft 30 are arranged two clamping cones 14, which are oriented oppositely to each other.

Between the clamping cones 14 are found the clamping jaws 13, which are preferably held around the clamping shaft 30 by retaining elements 31. As the retaining elements 31 O-rings have proved successful, though other retaining elements 31 too are conceivable, wherein it is important that the clamping jaws 13 or the clamping diameter formed by the clamping jaws 13 is/are adjustable and the clamping jaws 13 can travel outwards and inwards. The adjustment of the outside diameter by means of the clamping jaws 13 is achieved by virtue of the fact that, through rotation of the clamping shaft 30, the clamping cones 14, due to that thread on the clamping shaft 30 on which a clamping cone 14 is arranged, move towards each other or away from each other and this, in turn, pushes the clamping jaws 13 on the clamping cones 14 up or down or inwards or outwards. Of course, the adapted diameter-specific jaws 29 move correspondingly along therewith and allow a clamping of the medium-conveying pipe 27. In order to ensure that the clamping jaws 13 bear tightly against the clamping cones 14, the clamping cones 14 have cone segments 15, preferably a clamping cone 14 has three cone segments 15, which allow the clamping jaws 13 a peripheral support.

Figure 4:
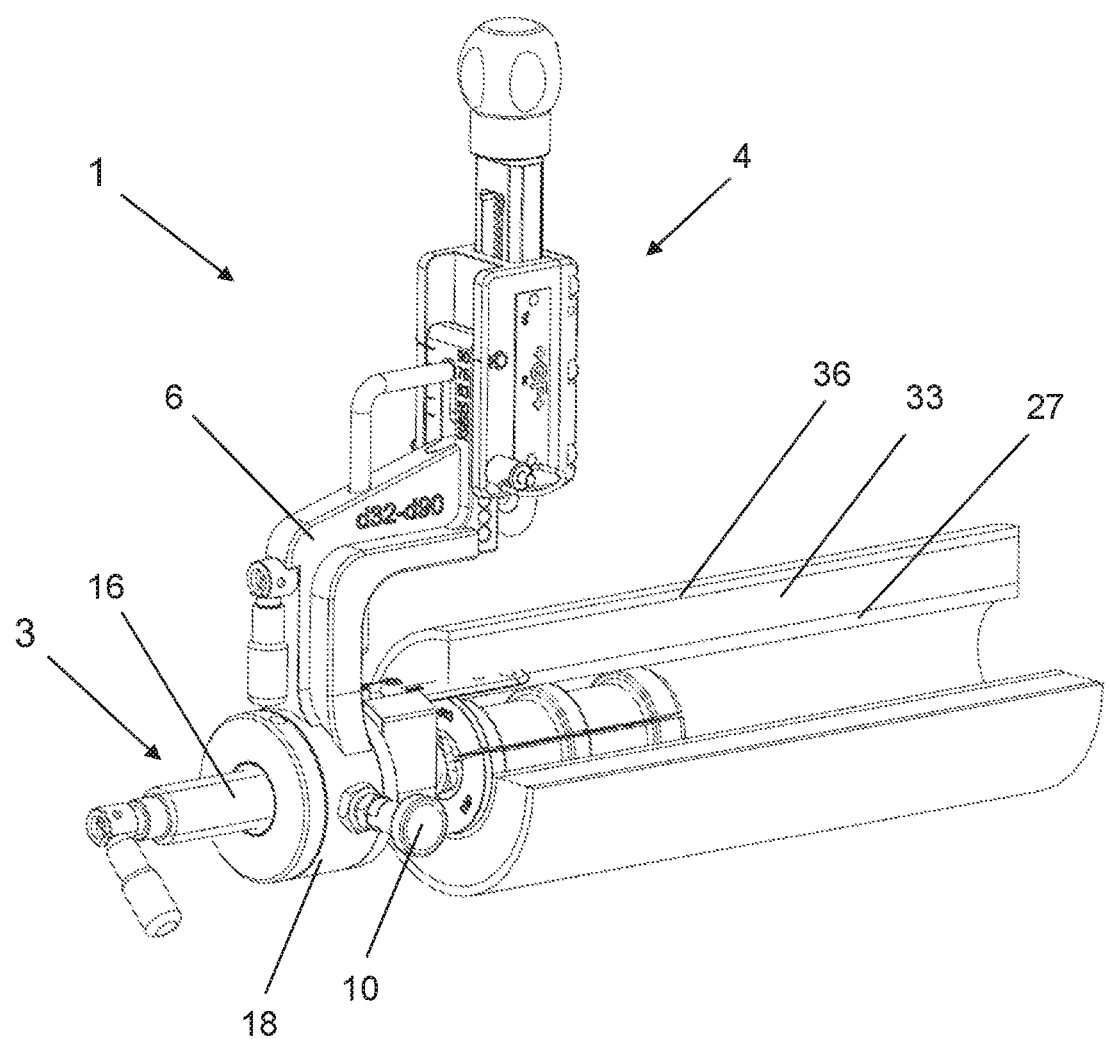
FIG. 4 shows a three-dimensional view of a tool according to the invention with clamped pipe end.

If a pipe end is now clamped in place on the clamping unit 2, as can be seen in FIG. 4, a feed movement along the feed region 16 of the guide unit 3 is effected by the rotation of the carrier 6 with the aid of a handle 20. The stripping and paring unit 5 likewise move rotatingly in the direction of the pipe or in the pipe. The stripping and paring unit 5 has a paring element 7, preferably a paring blade, and a stripping element 8, preferably a stripping contour 8. The stripping and paring is hence realized during the same feed movement or simultaneously. The stripping and paring unit 5 preferably comprises a blade holder 21, to which a blade 9 is fastened, wherein the paring element 7 or the paring blade, and the stripping element 8 or the stripping contour, are arranged on the blade 9. The stripping contour 8 extends preferably along the periphery of the blade 9 or over a certain region of the periphery of the blade 9 and is preferably configured as a bevel. The paring blade 7 is formed by a notch in the blade 9 or by an edge of the notch in the blade 9. As already described, the stripping and paring unit 5 is diameter-specific, that is to say that the stripping and paring unit 5 can be used in accordance with the pipe end to be stripped. This means that, on the one hand, the blade 9 is positioned precisely at the position of the outer casing surface of the medium-conveying pipe and, on the other hand, the pipe length to be stripped is precisely defined by the length of the blade 9 and the stop face 32 on the blade holder 21, whereby a manual measurement becomes superfluous.

At the upper end of the carrier 6 is arranged the cutting unit 4 of the paring and cutting tool 1, which latter serves to cut off the outer pipe and the insulating layer. In order to be able to actuate the cutting unit 4 after the stripping and paring operation, the unlocking unit 10 in the bearing region of the carrier 6 must be unlocked in order to release the locking mechanism. The unlocking unit 10, which acts, through a bore, on the spindle nut 19, effects the fixing between carrier 6 and spindle nut 19 with intermediate bearings 35. If the unlocking unit 10 is now released, the bearing 35 can rotate freely or the carrier 6 can rotate about the upright spindle nut 19. This enables a circumferential cut around the pipe end or the outer pipe. In order to reset the cutting depth of the cutting unit 4 in order that also the complete insulating layer is cut through, the rotary cutter 23 is lowered via a spindle 24, wherein the adjustment of the spindle 24 is made at the knob 26. Since it is advantageous if the cutting unit 4, during the stripping and paring operation, is somewhat further distanced from the pipe end, and the adjustment of the cutting unit 4 to a position closer to the pipe is intended not to be made slowly via the spindle 24, but instead to proceed rapidly, the spindle 24 is disposed in a slide 25, which is able to be pushed downwards, by the pressure on the knob 26, as far as the starting position for the rotary cutter 23 for cutting. The further adjustment of the rotary cutter 23 is then realized via the spindle 24, wherein the adjustment is made during several revolutions of the cutting unit 4 around the pipe end or during the cutting operation until the insulating layer is cut through. The cutting unit 4 similarly comprises a tension spring (not visible), which brings the slide 25, by release of the locking mechanism 28, back into the starting position or into the position distanced from the pipe or from the clamping unit 2.

As already mentioned, the paring and cutting tool 1 is usable for the different pipe diameters and easily convertible. Besides the dimension-specific stripping and paring unit 5, which is to be appropriately fitted on the spindle nut 19, the tool 1 also has a pipe-dimension-related coding system 11, which prevents damage to the medium-conveying pipe 27. The coding system has a dimension-limiting bracket 12, which is fixed to the cutting unit 4 and predefines the height adjustment of the cutting unit 4 due to the fastened stripping and paring unit, or does not allow too low a setting.

If, for instance, a stripping and paring unit 5 is installed for a 90 mm medium-conveying pipe, the dimension-limiting bracket 12 prevents lowering of the cutting unit 4 on the carrier 6 onto the underlying positioning bores 22 for smaller sized medium-conveying pipes, since the dimension-limiting bracket 12 is already prematurely butting against the stripping and paring unit 5.

What is claimed is:

1. A paring and cutting tool for the stripping and paring of pre-insulated pipe ends, in particular of the outside diameter of the medium-conveying pipe, comprising a clamping unit for the centric reception of the pipe end, a guide unit for the feed movement of the stripping and paring unit, wherein the guide unit extends through the clamping unit, a cutting unit for separating the outer pipe and the insulating layer, a carrier and a stripping and paring unit, wherein the stripping and paring unit has a paring element, preferably a paring blade, and a stripping element, preferably a stripping contour, for the simultaneous stripping and paring of the pipe end, in particular of the medium-conveying pipe end;

wherein the paring and cutting tool has an unlocking unit, wherein the unlocking of the unlocking unit enables the actuation of the cutting unit.

2. The paring and cutting tool according to claim 1, wherein the paring element and the stripping element are arranged on a blade, preferably on the same blade.

3. The paring and cutting tool according to claim 1, wherein the paring and cutting tool has a pipe-dimension-related coding system, wherein the coding system serves to avoid errors with respect to an incorrectly adjusted paring and cutting tool.

4. The paring and cutting tool according to claim 3, wherein the coding system has a dimension-limiting bracket.

5. The paring and cutting tool according to claim 1, wherein the clamping unit has clamping jaws, preferably three.

6. The paring and cutting tool according to claim 1, wherein the clamping unit has clamping cones.

7. The paring and cutting tool according to claim 6, wherein the clamping cones are formed of at least two, preferably three cone segments, wherein their centre points are arranged regularly on a circle.

8. The paring and cutting tool according to claim 1, wherein the guide unit has a feed region for the stripping and paring of the pipe end and a clamping region for the clamping of the clamping unit, wherein the feed region and the clamping region are preferably arranged coaxially one behind the other.

9. The paring and cutting tool according to claim 1, wherein the carrier has a mounting.

10. A method for stripping and paring a pre-insulated pipe end by means of a paring and cutting tool according to claim 1, wherein stripping and paring of the medium-conveying pipe takes place during the same feed movement of the stripping and paring unit.

11. The method according to claim 10, wherein the outer protective pipe and the insulating layer are cut through after the stripping and paring of the medium-conveying pipe.

12. A paring and cutting tool for the stripping and paring of pre-insulated pipe ends, in particular of the outside diameter of the medium-conveying pipe, comprising a clamping unit for the centric reception of the pipe end, a guide unit for the feed movement of the stripping and paring unit, wherein the guide unit extends through the clamping unit, a cutting unit for separating the outer pipe and the insulating layer, a carrier and a stripping and paring unit, wherein the stripping and paring unit has a paring element, preferably a paring blade, and a stripping element, preferably a stripping contour, for the simultaneous stripping and paring of the pipe end, in particular of the medium-conveying pipe end;

wherein the paring element and the stripping element are arranged on a blade.

13. A paring and cutting tool for the stripping and paring of pre-insulated pipe ends, in particular of the outside diameter of the medium-conveying pipe, comprising a clamping unit for the centric reception of the pipe end, a guide unit for the feed movement of the stripping and paring unit, wherein the guide unit extends through the clamping unit, a cutting unit for separating the outer pipe and the insulating layer, a carrier and a stripping and paring unit, wherein the stripping and paring unit has a paring element, preferably a paring blade, and a stripping element, preferably a stripping contour, for the simultaneous stripping and paring of the pipe end, in particular of the medium-conveying pipe end;

wherein the paring and cutting tool has a pipe-dimension-related coding system, wherein the coding system serves to avoid errors with respect to an incorrectly adjusted paring and cutting tool.

* * * * *